(12) United States Patent
Li et al.

(10) Patent No.: US 9,230,049 B1
(45) Date of Patent: Jan. 5, 2016

(54) ARRAYING POWER GRID VIAS BY TILE CELLS

(71) Applicant: ORACLE INTERNATIONAL CORPORATION, Redwood Shores, CA (US)

(72) Inventors: Mu-Jing Li, Santa Clara, CA (US); Timothy P. Johnson, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/478,083

(22) Filed: Sep. 5, 2014

(51) Int. Cl.
*G06F 17/50* (2006.01)
(52) U.S. Cl.
CPC .................................. *G06F 17/5072* (2013.01)
(58) Field of Classification Search
USPC ........................................................ 716/120
See application file for complete search history.

(56) References Cited

U.S. PATENT DOCUMENTS

| | | |
|---|---|---|
| 7,007,258 B2 | 2/2006 | Li |
| 7,096,447 B1 | 8/2006 | Li et al. |
| 7,380,227 B1 | 5/2008 | Li |
| 7,519,929 B2 | 4/2009 | Li |
| 7,847,408 B2 | 12/2010 | Masleid et al. |
| 8,719,756 B2 * | 5/2014 | Li et al. .................. 716/125 |
| 2008/0127025 A1 | 5/2008 | Zorrilla et al. |
| 2009/0005789 A1 | 1/2009 | Charles |
| 2009/0321791 A1 | 12/2009 | Wagner |
| 2011/0209105 A1 | 8/2011 | Zhang |

* cited by examiner

*Primary Examiner* — Eric Lee
(74) *Attorney, Agent, or Firm* — Miles & Stockbridge, P.C.

(57) ABSTRACT

A system for designing a power grid for an integrated circuit system forms a plurality of half pitch tiles that do not have a via violation, where each half pitch tile has a different orientation. The system generates sub tile arrays from each of the half pitch tiles. The system then forms a plurality of quarter pitch tiles that do not have a via violation, where each quarter pitch tile has a different orientation. The system generates deep sub tile cell arrays from each of the quarter pitch tiles. The system then covers a plurality of adjacent individual sub tile cells of the power grid with one of the sub tile arrays, and covers a plurality of adjacent individual deep sub tile cells of the power grid with one of the deep sub tile arrays.

20 Claims, 5 Drawing Sheets

ARRAYING POWER GRID VIAS BY TILE CELLS

FIELD

One embodiment is directed generally to a computer system, and in particular to a computer design and analysis tool for integrated circuit design.

BACKGROUND INFORMATION

Very-large-scale integration ("VLSI") circuits and other integrated circuits are made up of interconnected cells that include a group of transistors and interconnect structures. Each cell must be powered from a power supply through a power grid. The power grid of the circuit refers to the wires or buses used to supply current to the logic devices of each cell and to ground buses used to take current away.

As electronic circuit densities increase and technology advances, for example, in deep-sub-micron circuits, skilled designers attempt to maximize the utilization of the design layout and the manufacturability and reliability of the circuit. One area where design layout is particularly important is in the area of metal layers and vias. A via is used to connect, for example, two design geometries, one on each of two consecutive conductive layers (e.g., a metal line on each of two consecutive metal layers) of an electronic circuit. For example, it can be important to ensure that each connection area between two conductive layers has at least a certain number of vias and/or has vias placed appropriately to reduce the risk of via failure due to vacancy concentration of isolated vias.

However, correctly placing vias in an IC design is a very complex process. An electronic design automation ("EDA") tool or any computer based circuit design tool generally requires a long time to determine via placement for a dense circuit, and generates a very large database. For example, the fastest EDA tools typically require approximately 4 hours to generate a large via database on a 1500×3000 micron integrated circuit design.

SUMMARY

One embodiment is a system for designing a power grid for an integrated circuit. The system forms a plurality of half pitch tiles that do not have a via violation, where each half pitch tile has a different orientation. The system generates sub tile arrays from each of the half pitch tiles. The system then forms a plurality of quarter pitch tiles that do not have a via violation, where each quarter pitch tile has a different orientation. The system generates deep sub tile cell arrays from each of the quarter pitch tiles. The system then covers a plurality of adjacent individual sub tile cells of the power grid with one of the sub tile arrays, and covers a plurality of adjacent individual deep sub tile cells of the power grid with one of the deep sub tile arrays.

DETAILED DESCRIPTION

One embodiment determines repeatable cells formed of complex sub and and/or deep sub tile cells. The repeatable cells are used to form an array that is used for designing vias for a power grid of an integrated circuit ("IC").

In general, an electronic design automation ("EDA") tool can design a power grid for an IC by "tiling" cells. For example, U.S. Pat. No. 8,719,756, entitled "Power Grid Mosaicing With Deep-Sub-Tile Cells", discloses how to use mosaic tiles to cover a power grid design. However, the process disclosed in U.S. Pat. No. 8,719,756 generates a large amount of individual sub tile and deep sub tile cells that form a partial full pitch tile cell, resulting in a generally long run time and large database. Ideally, these cells should also be arrayed to reduce the database size and run time. However, the disclosed sub and deep sub tile cells cannot be easily piece together as an array because the sub tile cells can have up to four different orientation combinations, and the deep sub tile cells can have up to sixteen different orientation combinations.

In contrast, embodiments of the present invention form complex sub and deep sub tile cells that can transform sub and deep sub tiles cells with different orientations into a repeatable cell so that it can be used to form arrays. In an IC design database, each array counts as a single "instance" regardless of the size of the array. Therefore, the more arrays that can be used for a power grid design, the smaller the database and the shorter the run time.

Figure 1:
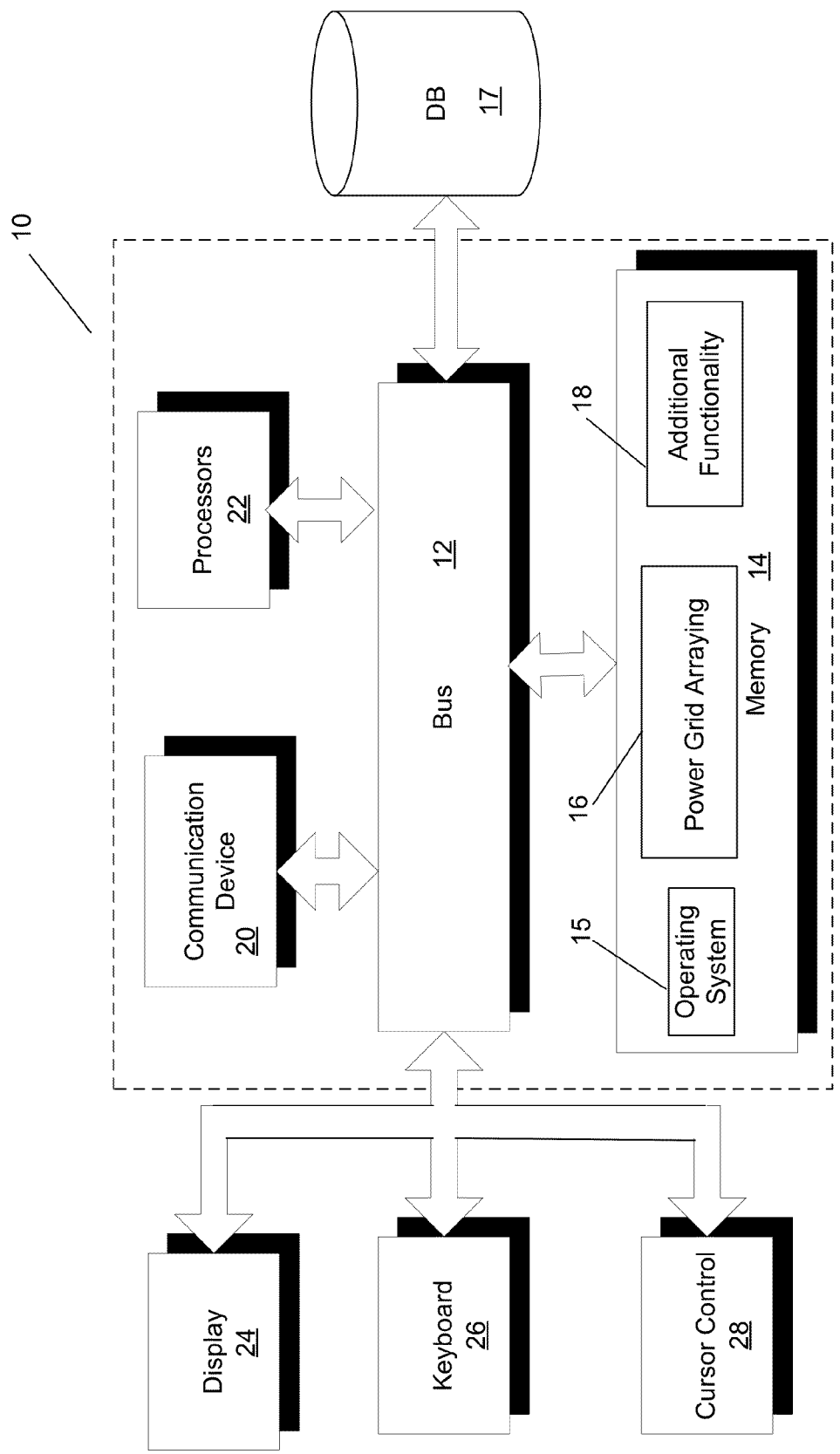
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media or storage device. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a power grid arraying module 16 for forming arrays used to design a power grid, and all other functionality disclosed herein. System 10 can be part of a larger system, such as an EDA. Therefore, system 10 can include one or more additional functional modules 18 to include the additional functionality. A database 17 is coupled to bus 12 to provide centralized storage for modules 16 and 18.

Figure 2:
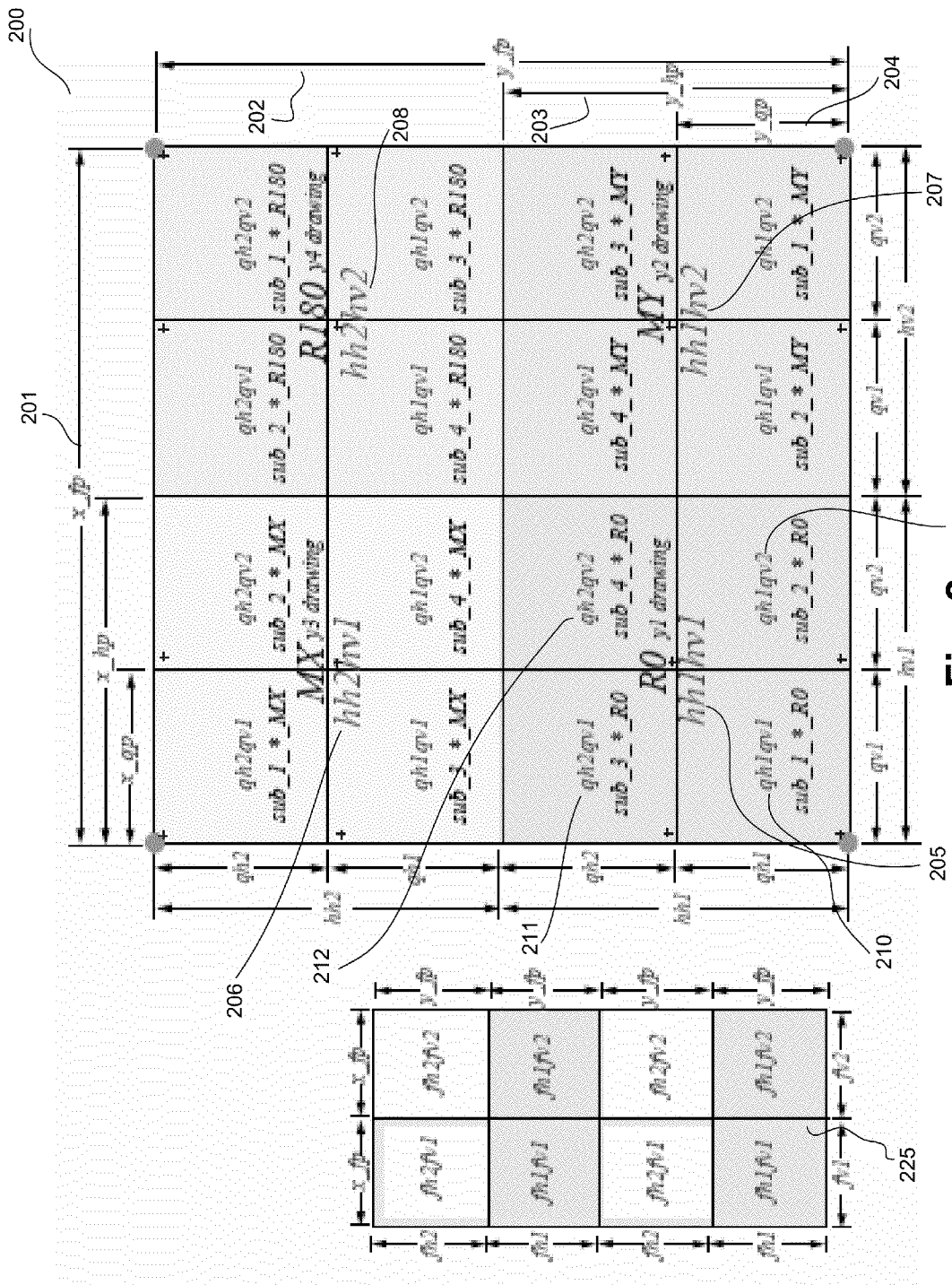
FIG. 2 is a block diagram illustrating a tile formed of sub tiles and deep sub tiles according to an embodiment of the invention.

FIG. 2 is a block diagram illustrating a tile 200 formed of sub tiles and deep sub tiles according to an embodiment of the invention. Tile 200 can be repeated to form an array. The complete tile 200 as shown in FIG. 2 is considered a "full pitch" tile, as indicated by "construction straps" "x_fp" 201 and "y_fp" 202 ("fp" indicates "full pitch"). However, in many embodiments, a subset of a full pitch tile is used to form an array. For example, a "half pitch" (e.g., "y_hp" 203) tile or a "quarter pitch" (e.g., "y_qp" at 204) tile. A set of eight full pitch tiles 225, two in the x direction and four in the y direction, are shown in FIG. 2.

Tile 200 includes four sub tiles ("hh1hv1" 205, "hh2hv1" 206, "hh1hv2" 207 and "hh2hv2" 208). Each of the sub tiles may be at a different orientation. For example sub tile 205 is at orientation "R0" (i.e., the "original" base orientation), while sub tile 208 is at orientation "R180", meaning a 180° rotation from sub-tile 205. Further, sub-tile 206 is at orientation "MX" or a mirroring of R0 along the X-axis, and sub-tile 207 is at orientation "MY", or a mirroring of R0 along the Y-axis.

Shown in FIG. 2 on the circumference are "construction straps" such as "hh1" (i.e., half horizontal 1), "qh1" (i.e., quarter horizontal 1), "hv1" (i.e., half vertical 1), etc. For the full pitch tiles 225, the construction straps include "fh1" (i.e., full horizontal 1), "fv1" (i.e., full vertical 1), etc. A "construction tile" can be formed from the construction straps. A construction tile is considered an intermediate result tile that is used to form the arrays, as described below.

Each of the sub tiles of full pitch tile 200 are formed of four deep sub tiles. For example, sub tile 205 includes deep sub tiles "qh1qv1" 210, "qh2qv1" 211, "qh2qv2" 212 "qh1qv2" 213. As with the sub tiles, each deep sub tile within a sub tile can be at a different orientation.

Therefore, as shown in FIG. 2, a full pitch tile is formed by four sub tile cell instances and a sub tile cell is formed by four asymmetric deep sub tile cell instances, and their pitches are in x/y_fp, x/y_hp, and x/y_qp in the X and Y directions, respectively. A sub tile cell can be used in different orientations to form a tile cell. Four asymmetric deep sub tile cell instances are used to form a sub tile cell. A tile cell that is formed by four sub tile cell instances can be viewed in different orientations. A tile cell that is formed by four deep sub tile cells can be viewed in sixteen different orientation combinations.

A tile cell can be repeated both in the X and Y direction with the same orientation, so it can be used to form an array of any size. However, neither a sub tile cell or a deep sub tile cell can be repeated with the same orientation. One embodiment of the invention disclosed in U.S. Pat. No. 8,719,756 involves, after placing full pitch tile cell arrays, all of the other areas of the power grid that cannot be covered by a full pitch tile cell (i.e., a mismatch is determined by the EDA) are filled by individual sub tile cells with different orientations. For those areas that cannot even be covered by a sub tile cell, deep sub tile cells in different orientations are used to fill the remaining areas. Although sub tile, and deep sub tile cells already contain multiple vias, for a large scale design the number of sub tile and deep sub tile cell instances still can be large, which causes large database sizes and slows down the design process. In contrast, embodiments of the present invention create sub and deep sub cells that can be used to form sub tile cell arrays and deep sub tile arrays. Once created, embodiments determine how to place the arrays.

Figure 3:
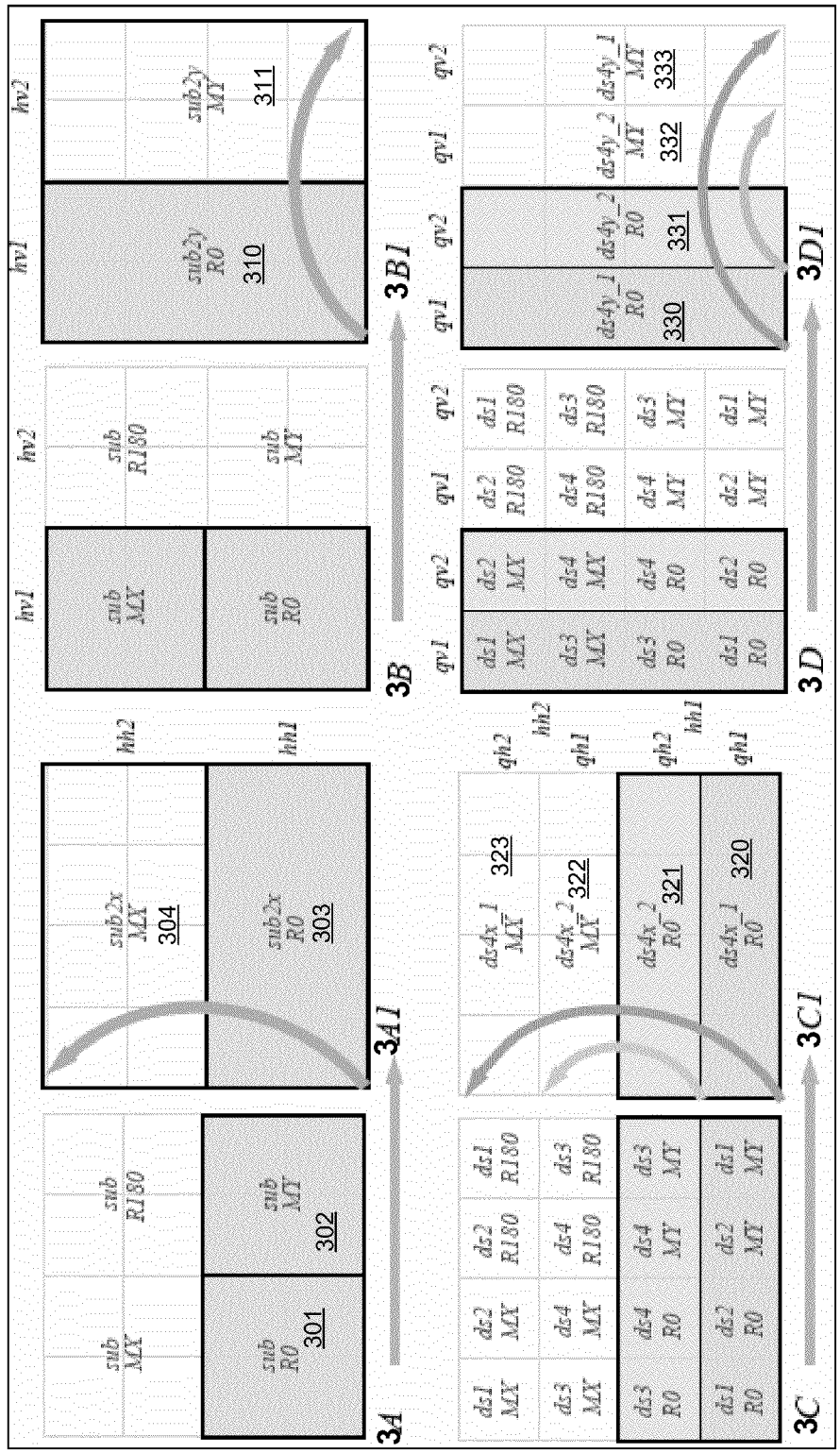
FIG. 3 is a block diagram illustrating the sub tiles and deep sub tiles that can form an array in accordance to embodiments of the invention.

FIG. 3 is a block diagram illustrating the sub tiles and deep sub tiles that can form an array in accordance to embodiments of the invention. As shown in FIG. 3, a sub tile combination in a full pitch tile in either the X direction span or Y direction span is a repeatable pattern as a full tile pitch of either x_fp or y_fp. Further, any deep sub tile cell combination in a full tile pitch span provides a similar repeatable pattern.

As shown in FIG. 3A, if a full pitch tile cell is cut in half horizontally, each half contains two sub tile cells 301, 302, and they can be mirrored on the X axis across from each other. Therefore, embodiments can create a symmetric sub2x cell to form a full tile cell by instantiating sub tile cell 303 twice in orientation R0 and MX, as shown in FIG. 3A1. The sub2x cell is considered symmetric because those instances that form a full pitch tile cell are from the same master sub2x cell with different orientations (i.e., the same master cell). For general design, the sub2x cell would not be used to form a tile cell, because if there is room for two sub2x cells to form a tile cell, a tile cell would already have been placed. Therefore, the symmetric sub2x cell is solely used to form sub-tile arrays in those areas that its X span is a multiple of x_fp, and its height is y_hp. When such an area is in an hh1 construction span/row, the array is placed in R0 orientation (cell 303). When such an area is in an hh2 construction row, it is placed in MX orientation (cell 304).

Similarly, as shown in FIGS. 3B and 3B1, a symmetric sub2y cell 310 can be created and also can be instantiated twice in the R0 and MY orientation, respectively, to form a full tile cell. It can be used to cover those areas with a x_hp width and multiple of y_fp height columns. When an area is in an hv1 column, the array is placed in R0 orientation. Otherwise, it is placed in MY orientation, as cell 311.

With the symmetric sub tile cells 303, 304, 310, 311 shown in FIGS. 3A1 and 3B1, cell coverage can be provided for the y_hp height horizontal row and x_hp width vertical column areas that were originally covered by individual sub tile cells with different orientations.

As shown in FIGS. 3C and 3C1, two ds4x cells can be created to cover a sub2x cell, namely ds4x_1 320 and ds4x_2 321. Although cells 320 and 321 are in the same orientation, they are built using different asymmetric deep sub tile cells. The deep sub tile cell instances are considered asymmetric because they are formed from different master cells, so that one cannot be replaced by another by simply changing the orientation in a sub cell. As shown in FIG. 3C1, when these two cells are placed in an hh1 row, they are all in R0 orientation. When these two cells are placed in an hh2 row, they are all in MX orientation, which reflects the fact that a sub2x cell in hh2 should be placed in MX orientation to form sub tile cells 322, 323. There is no need to use these ds4x cells to cover a tile, or cover a sub2x cell, because if there is room for a tile or a sub2x cell, a tile cell or a sub2x cell would have been placed already. Instead, embodiments use these cells to cover those areas having a height of y_qp, and a width that is a multiple of x_fp. Within such an area, the cell can be repeated with the same orientation in the X direction to form an array. As shown in FIG. 3C1, when the y_qp height rows are in hh1, the ds4x cells are placed in R0 orientation. When they are in hh2, they are placed in MX orientation. More specifically, for a row that is in hh1 AND qh1, ds4x__1 R0 should be placed. When it is in hh1 AND qh2, ds4x__2 R0 should be placed. Because the cells in hh2 are placed in MX, therefore, when a row is in qh1, ds4x__2 MX should be placed. Otherwise, ds4x__1 MX should be placed.

FIGS. 3D and 3D1 show ds4y__1 330 and ds4y__2 331 cells that form a full tile cell. They are similar to what was described for ds4x cells, and they are used to cover x_qp width column areas as vertical cells 330, 331, 332, 333 along the Y axis.

In one embodiment, using only the combination of the sub tiles and deep sub tiles of FIG. 3 to form arrays, the processing solution to determine the placement of vias on a power grid for an IC is optimized to reduce the database size and processing time. One aspect of the present invention is determining that using only the set of sub tiles and deep sub tiles of FIG. 3 to form arrays provides the most optimized and efficient solution.

Figure 4:
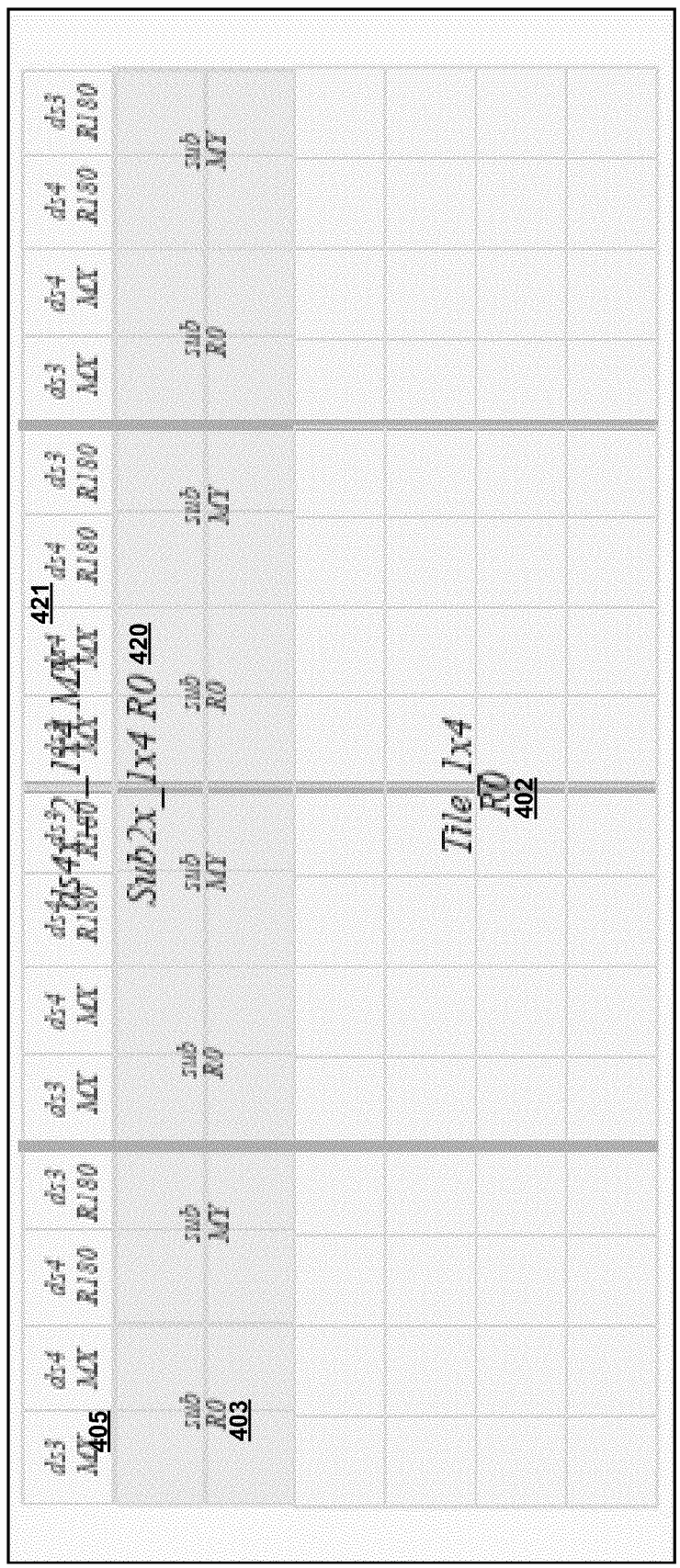
FIG. 4 illustrates a sample layout of tile arrays in accordance with one embodiment of the present invention.

FIG. 4 illustrates a sample layout of tile arrays in accordance with one embodiment of the present invention. As shown in FIG. 4, there is room to fill 1¾ rows of tile cells. Using prior art methods, without the use of the tile cells shown in FIG. 3, a solution would require a 1×4 full tile cell array 402 with eight sub tile cells (left to right starting at sub tile cell 403, and sixteen deep sub tile cells (left to right starting at deep sub tile cell 405). In contrast, using the cells of FIG. 3 in accordance with embodiments of the invention, a solution includes placing a 1×4 sub2x cell 303 array from FIG. 3 (shown at 420 of FIG. 4) and a 1×4 ds4x__2 cell 322 array from FIG. 3 (shown at 421 of FIG. 4). In one test embodiment, for a large scale design of approximately 1500× 3000 microns, embodiments reduced the IC design database size by as much as 93% and sped up the run time by approximately 25%.

One embodiment uses an algorithm to form arrays using the set of sub tiles and deep sub tiles of FIG. 3. Embodiments use the following three pairs of construction straps, shown in FIG. 2: fh1, fh2, fv1, fv2, hh1, hh2, hv1, hv2, qh1, qh2, qv1 and qv2. These pairs of construction straps are used to form a variety of full pitch tiles, half pitch tiles and quarter pitch tiles, and combinations. An algorithm used by embodiments is as follows:

Use fh1, fh2, fv1, and fv2 to form construction full pitch tiles fh1fv1, fh1fv2, fh2fv1 and fh2fv2, as shown in FIG. 2. Tiles in this set that do not have a touching violation are acceptable to be used for full pitch tile cells.

Merge these full pitch tile cells together as tile_all and output for filling full pitch tile arrays.

Use hh1, hh2, hv1 and hv2 to form construction half pitch tiles hh1hv1, hh1hv2, hh2hv1 and hh2hv2, as shown in FIG. 2. Those half pitch tiles that are outside of tile_all and if without a touching violation are usable for sub tile cells. As disclosed in U.S. Pat. No. 8,719,756, these sub tile cells can be placed in different orientations according to the good half pitch tiles.

However, in according to embodiments of the invention, rather than output individual sub tile cells at this stage, instead, embodiments attempt to determine possible sub tile cell arrays from these half pitch tiles. The sub tile cell arrays can be determined as follows:

Merge the four set of half pitch tiles as a sub_all set and find areas that are good for a sub2x array first.

Use construction strap hh1 to AND sub_all to get hh1_sub.

Use construction straps fv1 and fv2 to AND hh1_sub respectively, and pick out those x_fp*y_hp construction tiles as fv1_hh1_sub and fv2_hh1_sub. Each one of these tiles are good for a sub2x tile cell in R0.

Merge fv1_hh1_sub and fv2_hh1_sub to form sub2x_r0, and use to form sub2x array in R0.

Repeat the above steps by ANDing hh2 and sub_all to get hh2_sub. The resultant sub2x_mx is used to form sub2x array in MX.

Deduct sub2x_r0 and sub2x_mx from sub_all. The left over sub_all_left is used for finding sub2y arrays. These steps are similar to what have been described for sub2x. It uses hv1 and hv2 with fh1 and fh2 to find sub2y_r0 and sub2y_my for sub2y arrays placing in R0 and MY respectively.

Deduct all the sub2x and sub2y arrays from sub_all. The left over sub tiles are isolated from any array and are used for placing individual sub tiles with different orientations.

Embodiments then use qh1, qh2, qv1 and qv2 to form construction quarter pitch tiles qh1qv1, qh1qv2, qh2qv1 and qh2qv2, as shown in FIG. 2. Quarter pitch tiles that are outside of tile_all and sub_all and without a touching violation are good for deep sub tile cells. As disclosed in U.S. Pat. No. 8,719,756, these deep sub tile cells can be placed in different orientations at this stage.

However, in contrast, embodiments use these construction quarter pitch tiles to find good x_fp*y_qp and x_qp*y_fp construction tiles for ds4x and ds4y cells. A methodology in one embodiment is as follows:

Merge all the good quarter pitch tiles as ds_all.

AND qh1 and ds_all, and AND the result with hh1, to find qh1_hh1_ds.

AND qh1_hh1_ds with fv1 and fv2 to find all the construction tiles that are x_fp*y_qp and merge them together as ds4x__1_r0.

Repeat the above steps on qh2 to get ds4x__2_r0.

Repeat the above steps on those that are in hh2 to get ds4x__2_mx and ds4x__1_mx.

Repeat the steps for ds4x__1 and ds4x__2 to get ds4y__1_r0, ds4y__2_r0, ds4y__2_my, and ds4y__1_my.

Deduct all these ds4x and ds4y tiles from ds_all, and the left over is for placing individual deep sub tile cells in sixteen different orientation combinations.

As disclosed, four types of sub tile arrays and eight types of deep sub tile arrays can be formed, and they can cover the majority of individual sub and deep sub cells. Because the number of instances of arrays/cells have been dramatically reduced, the database size and run time is reduced accordingly.

Figure 5:
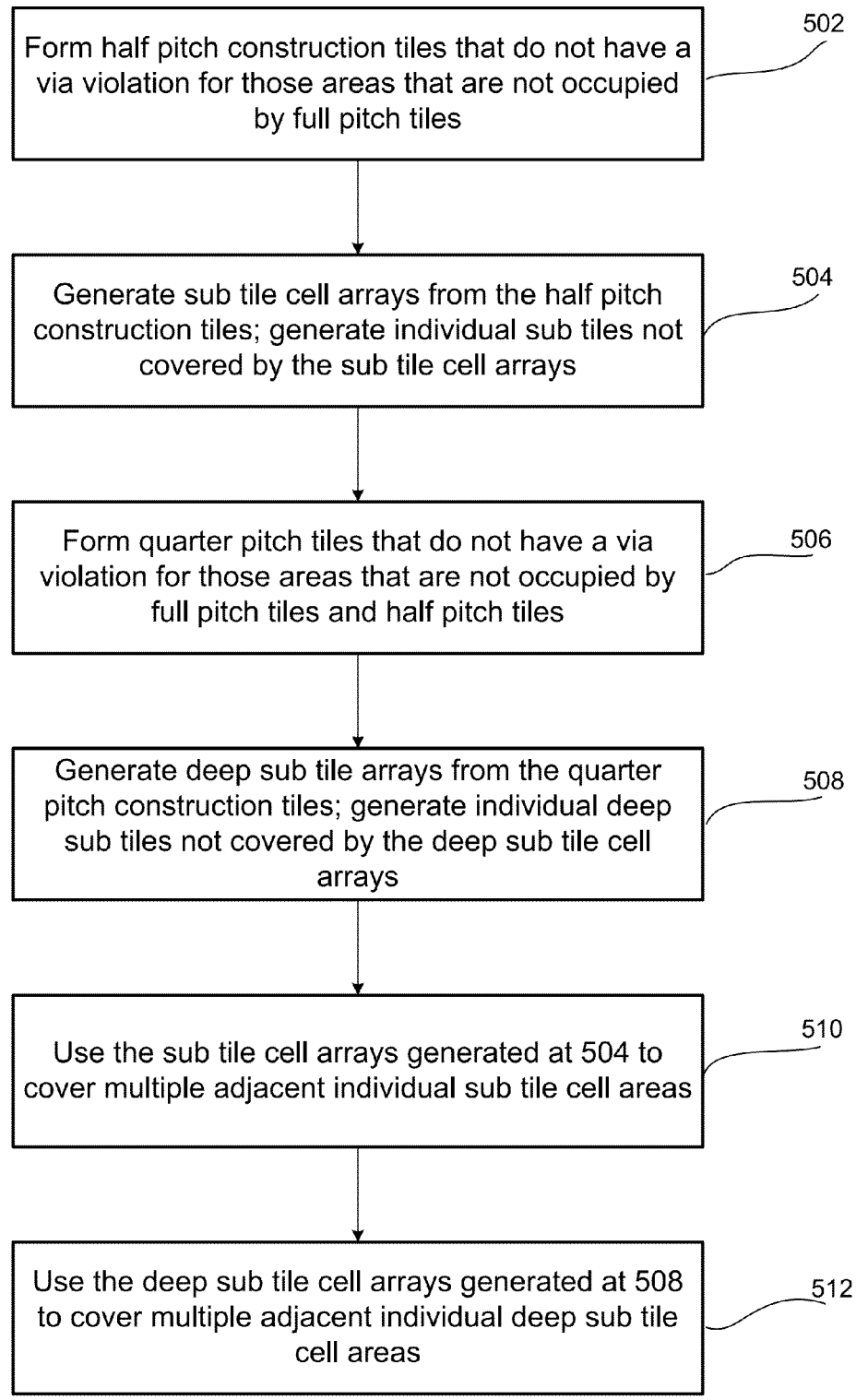
FIG. 5 is a flow diagram of the functionality of the system of FIG. 1 when forming arrays to design a power grid in accordance with an embodiment.

FIG. 5 is a flow diagram of the functionality of system 10 of FIG. 1 when forming arrays to design a power grid in accordance with an embodiment. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 502, symmetric half pitch construction tiles that do not have a via violation for those areas that are not occupied by full pitch tiles (e.g., the area starting at sub tile 403 of FIG. 4) are formed. In one embodiment, these half pitch construction tiles are hh1hv1, hh1hv2, hh2hv1 and hh2hv2, as shown in FIG. 2.

At 504, sub tile cell arrays are generated from the half pitch construction tiles of 502. In one embodiment, up to four different types of sub tile cell arrays can be generated (i.e., arrays based on sub tile cells 303, 304, 310, 311 of FIG. 3). These sub tile cell arrays, referred to as sub2x and sub2y, can be in two different orientations (i.e., sub2x—R0, sub2x—MX and sub2y—R0, sub2y—MY) for a total of four cell orientation combinations. A sub2x type of cell orientation can be arrayed in the X direction, and a sub2y type can be arrayed in the Y direction. After all possible sub tile areas are covered with the sub tile cell arrays (i.e., all sub tile arrays that can be covered with sub tile cell arrays based on factors such as geometry, via violations, orientations, etc.), individual sub tile cells for areas not covered with sub tile cell arrays are covered with up to four different orientation individual sub tiles.

At 506, asymmetric quarter pitch construction tiles that do not have a via violation are formed for those areas that are not occupied by full pitch tiles and half pitch tiles (e.g., the area starting at deep sub tile 405 of FIG. 4). In one embodiment, these quarter pitch tiles are qh1qv1, qh1qv2, qh2qv1 and qh2qv2, as shown in FIG. 2

At 508, deep sub tile arrays are generated from the asymmetric quarter pitch construction tiles of 506. In one embodiment, up to eight different types of deep sub tile cell arrays can be generated (i.e., arrays based on deep sub tile cells 320, 321, 322, 323, 330, 331, 332, 333 of FIG. 3). These deep sub tile cell arrays, referred to as ds4x_1, ds4x_2, ds4y_1 and ds4y_2, can have eight different cell orientation combinations, which would include up to sixteen individual cell orientation combinations. After all possible deep sub tile areas are covered with the deep sub tile cell arrays, individual deep sub tile cells for areas not covered with deep sub tile cell arrays are covered with individual deep sub tiles.

At 510, at least one of the sub tile cell arrays generated at 504 is used to cover multiple adjacent individual sub tile cell areas.

At 512, at least one of the deep sub tile cell arrays generated at 508 is used to cover multiple adjacent individual deep sub tile cell areas.

As disclosed, embodiments enable the arraying of symmetric sub tile cells and asymmetric deep sub tile cells with different orientations. Known solutions can array the same orientation tile cells, but cannot array cells that are placed together with different orientations. In contrast, embodiments are able to array a large amount of the individual tile, sub tile and deep sub tile cells.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer-readable medium having instructions stored thereon that, when executed by a processor, cause the processor to design a power grid for an integrated circuit, the designing comprising:
   forming a plurality of half pitch tiles that do not have a via violation, wherein each half pitch tile has a different orientation;
   generating a plurality of types of sub tile cell arrays from each of the half pitch tiles, wherein at least one of the sub tile cell arrays has an asymmetric vertical and horizontal dimension;
   forming a plurality of quarter pitch tiles that do not have a via violation, wherein each quarter pitch tile has a different orientation;
   generating a plurality of types of deep sub tile cell arrays from each of the quarter pitch tiles, wherein at least one of the deep sub tile cell arrays has the asymmetric vertical and horizontal dimension;
   covering a plurality of adjacent individual sub tile cell areas of the power grid with one or more of the types of sub tile cell arrays; and
   covering a plurality of adjacent individual deep sub tile cell areas of the power grid with one or more of the types of deep sub tile cell arrays;
   wherein the covering the plurality of adjacent individual sub tile cell areas and the covering the plurality of adjacent individual deep sub tile cell areas determine a via placement layout for the power grid and generate an integrated circuit design that comprises the via placement layout and that is adapted to be used to manufacture a corresponding integrated circuit.

2. The computer readable medium of claim 1, wherein the plurality of half pitch tiles comprises hh1hv1, hh1hv2, hh2hv1 and hh2hv2.

3. The computer readable medium of claim 1, wherein the plurality of quarter pitch tiles comprises qh1qv1, qh1qv2, qh2qv1 and qh2qv2.

4. The computer readable medium of claim 1, wherein the plurality of types of sub tile cell arrays comprise sub tile cells that are symmetric, and the plurality of types of deep sub tile cell arrays comprise deep sub tile cells that are asymmetric.

5. The computer readable medium of claim 1, wherein the sub tile cell arrays comprise sub2x and sub2y.

6. The computer readable medium of claim 1, wherein the deep sub tile cell arrays comprise ds4x_1, ds4x_2, ds4y_1 and ds4y_2.

7. The computer readable medium of claim 1, the designing further comprising after all sub tile cell areas that can be covered with the types of sub tile cell arrays are covered, using individual sub tiles to cover remaining sub tile cell areas.

8. The computer readable medium of claim 1, the designing further comprising after all deep sub tile cell areas that can be covered with the types of deep sub tile cell arrays are covered, using individual deep sub tiles to cover remaining deep sub tile cell areas.

9. A method of designing a power grid for an integrated circuit, the method comprising:
   forming a plurality of half pitch tiles that do not have a via violation, wherein each half pitch tile has a different orientation;
   generating a plurality of types of sub tile cell arrays from each of the half pitch tiles, wherein at least one of the sub tile cell arrays has an asymmetric vertical and horizontal dimension;
   forming a plurality of quarter pitch tiles that do not have a via violation, wherein each quarter pitch tile has a different orientation;
   generating a plurality of types of deep sub tile cell arrays from each of the quarter pitch tiles, wherein at least one of the deep sub tile cell arrays has the asymmetric vertical and horizontal dimension;
   covering a plurality of adjacent individual sub tile cell areas of the power grid with one or more of the types of sub tile cell arrays; and
   covering a plurality of adjacent individual deep sub tile cell areas of the power grid with one or more of the types of deep sub tile cell arrays;
   wherein the covering the plurality of adjacent individual sub tile cell areas and the covering the plurality of adjacent individual deep sub tile cell areas determine a via placement layout for the power grid and generate an integrated circuit design that comprises the via placement layout and that is adapted to be used to manufacture a corresponding integrated circuit.

10. The method of claim 9, wherein the plurality of half pitch tiles comprises hh1hv1, hh1hv2, hh2hv1 and hh2hv2.

11. The method of claim 9, wherein the plurality of quarter pitch tiles comprises qh1qv1, qh1qv2, qh2qv1 and qh2qv2.

12. The method of claim 9, wherein the plurality of types of sub tile cell arrays comprise sub tile cells that are symmetric, and the plurality of types of deep sub tile cell arrays comprise deep sub tile cells that are asymmetric.

13. The method of claim 9, wherein the sub tile cell arrays comprise sub2x and sub2y.

14. The method of claim 9, wherein the deep sub tile cell arrays comprise ds4x_1, ds4x_2, ds4y_1 and ds4y_2.

15. The method of claim 9, further comprising after all sub tile cell areas that can be covered with the types of sub tile cell arrays are covered, using individual sub tiles to cover remaining sub tile cell areas.

16. The method of claim 9, further comprising after all possible deep sub tile cell areas that can be covered with the types of deep sub tile cell arrays are covered, using individual deep sub tiles to cover remaining deep sub tile cell areas.

17. An integrated circuit design system comprising:
a processor;
a storage device coupled to the processor and storing a power grid arraying module that, when executed by the processor, designs a power grid by:
    forming a plurality of half pitch tiles that do not have a via violation, wherein each half pitch tile has a different orientation;
    generating a plurality of types of sub tile cell arrays from each of the half pitch tiles, wherein at least one of the sub tile cell arrays has an asymmetric vertical and horizontal dimension;
    forming a plurality of quarter pitch tiles that do not have a via violation, wherein each quarter pitch tile has a different orientation;
    generating a plurality of types of deep sub tile cell arrays from each of the quarter pitch tiles, wherein at least one of the deep sub tile cell arrays has the asymmetric vertical and horizontal dimension;
    covering a plurality of adjacent individual sub tile cell areas of the power grid with one or more of the types of sub tile cell arrays; and
    covering a plurality of adjacent individual deep sub tile cell areas of the power grid with one or more of the types of deep sub tile cell arrays;
wherein the covering the plurality of adjacent individual sub tile cell areas and the covering the plurality of adjacent individual deep sub tile cell areas determine a via placement layout for the power grid and generate an integrated circuit design that comprises the via placement layout and that is adapted to be used to manufacture a corresponding integrated circuit.

18. The system of claim 17, wherein the plurality of half pitch tiles comprises hh1hv1, hh1hv2, hh2hv1 and hh2hv2.

19. The system of claim 17, wherein the plurality of quarter pitch tiles comprises qh1qv1, qh1qv2, qh2qv1 and qh2qv2.

20. The system of claim 17, wherein the plurality of types of sub tile cell arrays comprise sub tile cells that are symmetric, and the plurality of types of deep sub tile cell arrays comprise deep sub tile cells that are asymmetric.

* * * * *